United States Patent
McAfee et al.

(10) Patent No.: US 8,609,194 B2
(45) Date of Patent: Dec. 17, 2013

(54) METHOD AND APPARATUS FOR COMPOSITION COATING FOR ENHANCING WHITE LIGHT SCANNING OF AN OBJECT

(75) Inventors: Scott Timothy McAfee, Jensen Beach, FL (US); Wade Harris Rigsby, Port St. Lucie, FL (US)

(73) Assignee: Level 3 Inspection, LLC, Jupiter, FL (US)

( * ) Notice: Subject to any disclaimer, the term of this patent is extended or adjusted under 35 U.S.C. 154(b) by 673 days.

(21) Appl. No.: 12/691,484

(22) Filed: Jan. 21, 2010

(65) Prior Publication Data

US 2011/0176721 A1    Jul. 21, 2011

(51) Int. Cl.
*G06K 9/00* (2006.01)

(52) U.S. Cl.
USPC ..... 427/317; 427/421.1; 427/98.9; 106/15.05

(58) Field of Classification Search
USPC .............. 427/317, 98.9, 421.1; 106/15.05
See application file for complete search history.

(56) References Cited

U.S. PATENT DOCUMENTS

| | | | |
|---|---|---|---|
| 3,169,882 A * | 2/1965 | Kock et al. | 427/475 |
| 6,532,064 B1 | 3/2003 | Hearn | |
| 6,917,421 B1 | 7/2005 | Wihl | |
| 7,024,787 B2 | 4/2006 | Varsell et al. | |
| 7,036,236 B1 | 5/2006 | Drescher et al. | |
| 7,205,026 B2 * | 4/2007 | Groeger et al. | 427/314 |
| 7,325,750 B2 * | 2/2008 | Shutic et al. | 239/1 |
| 7,436,522 B2 * | 10/2008 | Steinbichler et al. | 356/601 |
| 7,573,586 B1 | 8/2009 | Boyer et al. | |
| 7,578,178 B2 | 8/2009 | Boyer et al. | |
| 7,778,788 B2 | 8/2010 | Joyner et al. | |
| 7,869,026 B2 | 1/2011 | Boyer et al. | |
| 2002/0057438 A1 | 5/2002 | Decker | |
| 2006/0141003 A1 * | 6/2006 | McDaniel | 424/422 |
| 2008/0199625 A1 * | 8/2008 | Niwa | 427/407.1 |
| 2008/0245262 A1 * | 10/2008 | Stotzel et al. | 106/18.31 |
| 2009/0080036 A1 | 3/2009 | Patterson et al. | |
| 2009/0153877 A1 * | 6/2009 | Grosskurth et al. | 356/601 |
| 2009/0273792 A1 | 11/2009 | Hullin et al. | |

FOREIGN PATENT DOCUMENTS

| | | |
|---|---|---|
| DE | 10108221 | 9/2002 |
| DE | 10230494 | 2/2003 |
| WO | WO2007/056974 | 5/2007 |
| WO | WO2007056974 | * 5/2007 |

* cited by examiner

*Primary Examiner* — Timothy Meeks
*Assistant Examiner* — Nathan T Leong
(74) *Attorney, Agent, or Firm* — McHale & Slavin, P.A.

(57) ABSTRACT

The invention is directed to a method and apparatus for pretreatment an object to be white light scanned to enable accurate and consistent scanning. In those instances where the object part has a reflective or refractive surface or is made from a material having translucent or transparent properties the object must be pretreated to ensure accurate data collection during the scanning process. The object is coated with a composition forming a thin and uniform film of non destructive material coating to enhance the surface contrast characteristics for the mono-chromatic fringe pattern employed in the white light scanning process.

10 Claims, 3 Drawing Sheets

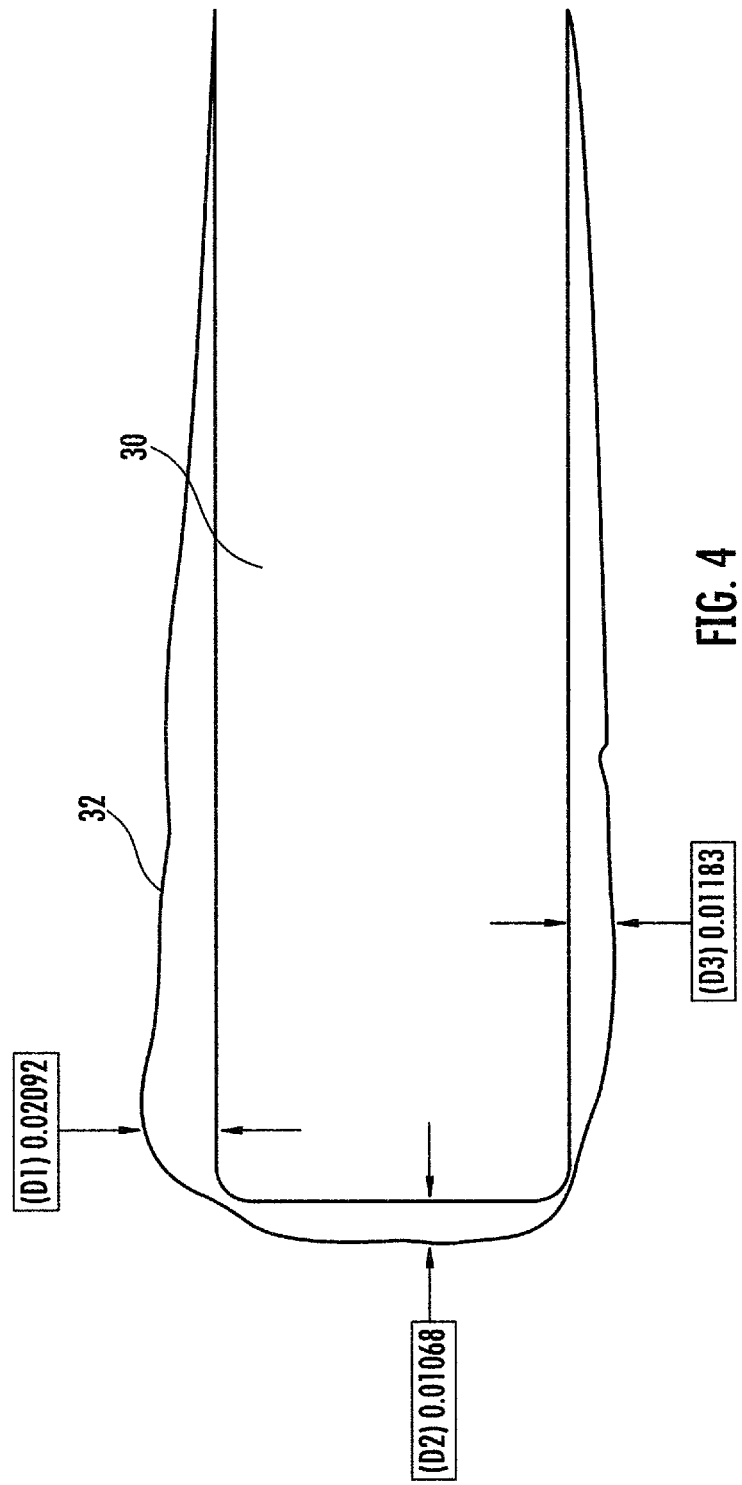

METHOD AND APPARATUS FOR COMPOSITION COATING FOR ENHANCING WHITE LIGHT SCANNING OF AN OBJECT

FIELD OF THE INVENTION

The present invention generally relates to systems and methods of white light scanning for three-dimensional inspection and or photogrametry of a specimen. More particularly the invention relates to white light scanning of objects having reflective or light refractive surfaces. Objects having a polished surface or formed from a translucent or transparent material require the application of a composition coating that will enhance the surface characteristics for the white light scanning process.

BACKGROUND OF THE INVENTION

White light scanning is an optical three dimensional geometric measuring system which is based on the principle of triangulation. To create the object surface digital model, a structured white light source is used to project controlled fringe patterns on the object. These fringe patterns are recorded as high resolution images with twin digital cameras. The data collected by theses cameras are used to create a highly accurate and precise image of the object's entire surface. While contact measurement systems and devices provide only a partial set of landmark measurements on the object, white light three dimensional scanning captures the entire surface. The scanner is capable of picking up tens of thousands of data points per second and the highly automated process insures consistency and quality.

This highly accurate complete three dimensional digital model is then compared to the object's original CAD model and any geometric variation between these two is vividly shown in "color plots" with adjustable tolerance ranges as well as complete tables of measurement and deviation numbers. The increased ease of interpretation and understanding from these color plot reports is one of the key advantages of this method of geometric measurement and quality analysis. This process enables quick and accurate product inspection, such as prior to production implementation, or after periods of extended use and or product remanufacture and so on. The inspection performs a comparative analysis of the CAD model to the actual product thereby identifying the imperfections. In addition, because white light three dimensional scanning is non destructive analysis and encompasses the entire object it is possible to reverse engineer the object based on the data collected during the scanning process. This enables the remanufacture of parts for which there is no CAD data. The white light scanning is an important tool in the design and development of products, the tooling and fixturing for manufacture and the inspection of the product at any point in its life cycle. It has applicability in a large number of manufacturing enterprises such as the aerospace, automotive, and medical industries, for example.

The white light three dimensional scanning process will encounter problems where the surfaces to be scanned are reflective, refractive or the object is translucent or transparent. Conventionally an object may be coated with spray paint or with a powder like material to enhance surface characteristics of an object. However, while these techniques may provide assistance in the white scanning process, the result in a non-uniform surface finish which destroys the ability to use the white light scanning process to provide accurate and consistent three dimensional data collection. The system embodying the present invention is able to offer advantage including improved accuracy, reduced cost and increased usability over the conventional technologies.

DESCRIPTION OF THE PRIOR ART

U.S. Pat. No. 7,436,522 to Steinbichler et al, discloses a method to determine the 3D coordinates of the object. The 3D coordinates of a partial surface of the object are determined by a 3D scanning device which includes one or more detectors and whose position is determined by a tracking system. The 3D coordinates of an adjacent partial surface of the object are determined by the 3D measuring device. The 3D coordinates of an overlap region of the adjacent partial surfaces are put together by a matching method. In doing so, an error function is determined and minimized iteratively. The error function of a detector of the 3D measuring device is determined.

U.S. Pat. No. 6,917,421 to Wihl, is directed to systems and methods for assessing a dimension of a feature of an object. The system includes an illumination system configured to scan a specimen with light at multiple focal planes substantially simultaneously and multiple collectors. Approximately all light returned from one of the multiple focal planes may be collected by one of the collectors. In addition, the system may include a processor configured to assess dimension of the feature on the specimen in a direction substantially perpendicular to an upper surface of the specimen using the relative intensity.

U.S. Pat. No. 6,532,064 to Hearn et al, is directed to an automated inspection apparatus for detection of anomalies in a 3D translucent object. The apparatus has a scan head assembly including an image processing unit and image capture device, a first and second light source, and a conveyor. The disclosure is directed to a light block member positioned along a substantially common axis of the image capture device and a light source.

U.S. Published Patent Application Number 2002/0057438 to Decker, is directed to a method and apparatus for acquiring surface topography. The surface topography being acquired by illumination sources with patterns of light from one optical perspective and the light reflected off the surface is captured by image sensors from one optical perspective that is different than the perspective of the illumination. The images obtained are of the surface with one or more patterns superimposed upon the surface. The surface topography is computed with a processor based upon patterned image data, the known separation between the illumination sources and the imaging sensors, and knowledge about how the patterns of light are projected from the illumination sources.

U.S. Published Patent Application Number 2009/0080036 to Paterson et al, is directed to a scanner system and method that includes a scanner device, a target, and a processor. The scanner device includes an emitter for projecting patterned light and a sensor for capturing images of the object. The target had predetermined features visible to the sensor simultaneously with the object for enabling the processor to determine the location of the sensor with respect to the object. This generates a three dimensional model of the object with the patterned light projected thereon. The scanner further includes light sources for directionally illuminating the object and a sensor is arranged to capture images of the illuminated object. The processor generates sets of photometric date for the object when illuminated from different directions. The processor combines the geometric data and photometric data to output a model comprising geometric information on the object together with photometric information spatially registered with the geometric information.

U.S. Published Patent Application Number 2009/0273792 to Hullin et al, is directed to a system and method for scanning three dimensional objects with refractive surfaces, objects made of materials exhibiting a significant specular and or subsurface scattering component, light absorbing material such as diffusely reflecting, dark surfaces and compositions thereof. By analyzing the light rays that become visible due to fluorescence that than analyzing their reflections off the surface, the intersections points between a projected laser sheet and the object surface may be detected for a wide range of different materials.

SUMMARY OF THE INVENTION

The invention is directed a method and apparatus for pretreating an object to be scanned to enable accurate and consistent preparation of samples prior to white light scanning and data collection. In those instances where the component part has a reflective or refractive surface or is made from a material having translucent or transparent properties the object must be pretreated to ensure accurate data collection during the scanning process. The object is coated with a composition coating consisting of a thin film of non destructive material to enhance the surface contrast characteristics for the mono-chromatic fringe pattern employed in the white light scanning process. The composition coating can be easily and quickly applied to the object and is likewise easily removed from the object after completion of the scanning process.

Accordingly, it is an objective of the instant invention to provide a method for applying a composition coating to an object prior to white light scanning and three dimensional data collection.

It is a further objective of the instant invention to provide a composition that is applied to an object prior to white light scanning and three dimensional data collection that will enhance the surface characteristics for the white light scanning process.

It is yet another objective of the instant invention to provide an apparatus for applying a composition coating to an object prior to white light scanning and three dimensional data collection.

It is a still further objective of the invention a system to providing an accurate and consistent white light scanning of an object that is cost effective, efficient to use and non destructive to the object being scanned.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 4 is a diagrammatic representation of the comparative test data.

DETAILED DESCRIPTION OF THE INVENTION

The present invention is directed to a white light scanning and three dimensional data collection system such as that manufactured by Steinbichler® or the AICON® Photogrammetry system, for example. White light scanning is an optical three dimensional geometric measuring system which is based in the principle of triangulation. To create the object surface digital model, a structured white light source is used to project controlled fringe patterns on the object, which are recorded as high resolution images with twin digital cameras. These stereo digital cameras are rigidly mounted at precise separation distances and angles relative to each other, establishing the fixed reference foundation for the digital image. Based on this reference foundation and regular system calibration, the three dimensional coordinates for each camera pixel are calculated with exceptionally high accuracy and precision. All individual stereo camera measurements, of up to four million data points each, are aligned into the same coordinate system based on the fixed reference points, and merged to a create a complete "point cloud" three dimensional image of the object's surface.

Figure 1:
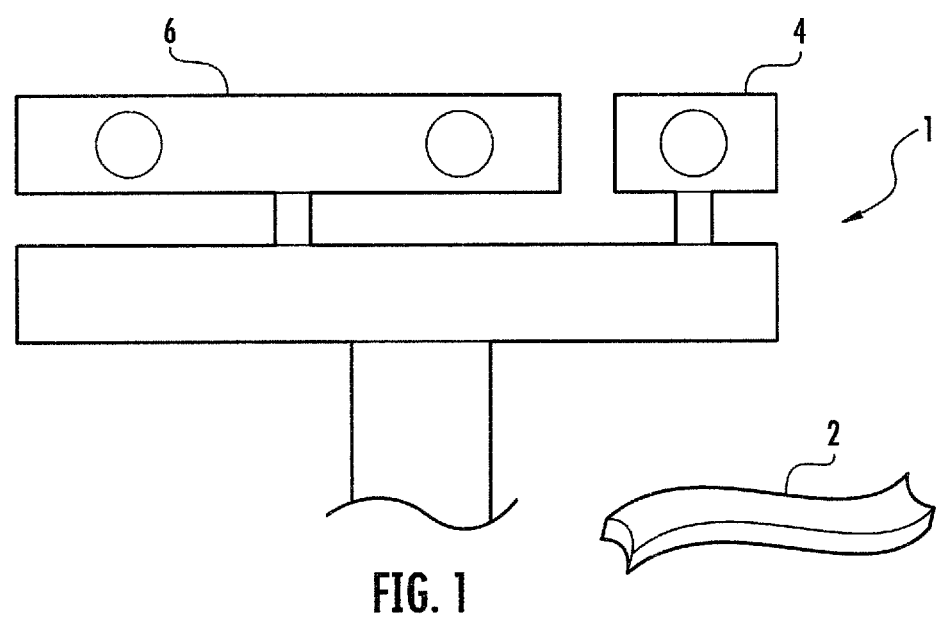
FIG. 1 is a schematic representation of the scanning equipment and the object to be scanned.

FIG. 1 is a schematic representation of the scanning equipment and the object to be scanned. As shown therein, the scanner 1 includes a structured white light source 4 that is used to project controlled fringe patterns on the object 2. Two digital cameras 6 are mounted on the scanner 1 at specific distances and relative angles. The data collected by the cameras 6 is then transmitted to computer processing unit and processed to create a complete "point cloud" three dimensional image of the object's surface. The consolidated data point cloud is converted into a polygonized mesh of interlocking triangles of varying densities, depending on the curvature and complexity of the object 2. This polygonized mesh of interlocking triangles of varying densities, depending on the curvature and complexity of the object. The complete three dimensional model is then compared to the objects original CAD model, and any geometric variation between these two is identified.

When scanning objects that have a reflective or highly polished surface a composition coating must be applied to the surface prior to scanning to enhance contrast characteristics for a mono-chromatic fringe pattern employed in the white light scanning process and three dimensional data collection. Examples of these objects would include but are not limited to turbine blades, orthopedic implant devices, gears, and other critical machined components. Likewise, if the object's surface is refractive or is formed from transparent or translucent material the composition coating must be applied to the surface of the object. It has been found that the application of paint from a conventional aerosol paint will result in a coating that is uneven in thickness. In addition, the use of an aerosol can paint spray will result in a coating of material that is unacceptably thick therby significantly reducing the accuracy of the collected data collected during the scanning process.

The present system has been invented to overcome the shortcomings of the prior process and system. As a first step, the object 2 is cleaned with de-natured alcohol and water such that the object is free of grease, oils, dirt or other debris. Gloves, made from nitrile, for example, should be worn from the beginning of the process through the completion of the scanning process so as to avoid contamination of the object. A composition coating is formulated from a tempera type paint, preferably white, is formed from a composition consisting of corn starch, water, titanium dioxide or other dispersed colorants, talc, calcium carbonate, a wetting agent, and a gel thickener. A small amount of biocide, fungicide and a defoamer can be added to the composition for storage purposes. White is preferred color for most applications although a darker pigment is preferred for translucent or transparent materials, such as plastic. If desired, the composition can be mixed thoroughly with deionized water in a ratio of up to 2 parts water to 1 part composition. The composition is passed through a paper media filter to remove impurities and solids that will affect the performance during the coating and measuring process.

Figure 2:
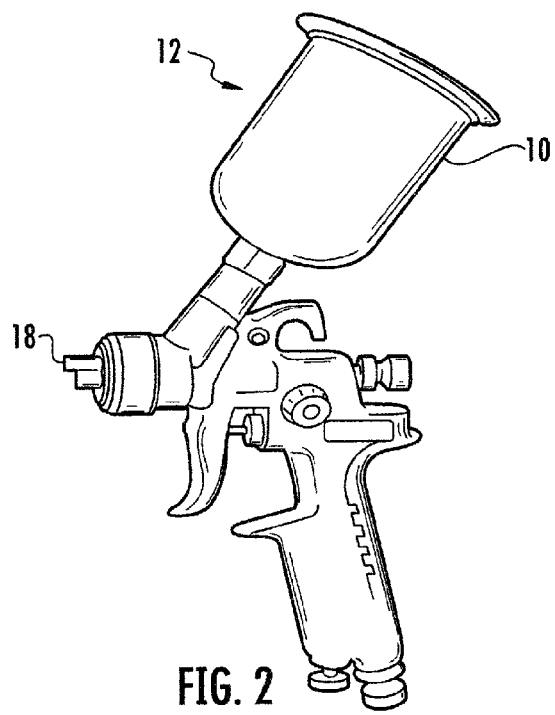
FIG. 2 is a perspective view of the air brush used to coat the object.

The composition is placed into the cup 10 of air powered sprayer 12 commonly referred to as an airbrush, as shown in FIG. 2. The airbrush 12 is then connected to air compressor that provides a regulated amount of air, between 5 and 40 psi, to the airbrush. The air brush 12 includes a spray nozzle 18 having a configuration that would be appropriate of the contour of the object being coated.

Figure 3:
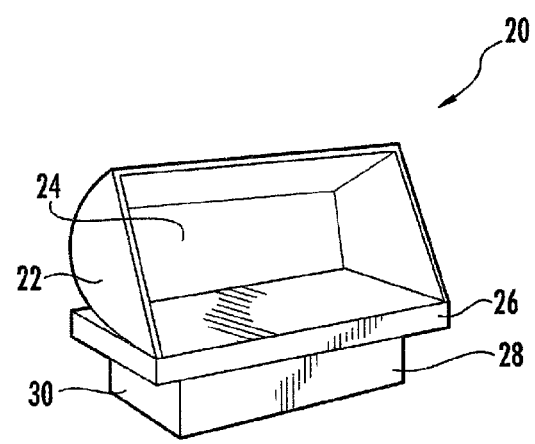
FIG. 3 is a perspective view of the pain booth used to coat the object.

The object 2 is then preheated using a hand held heat gun and the object is heated until it is warm to the touch but not too hot to hold, approximately 90 to 100° F. The heating of the object 2 will facilitate the evaporation of water from the composition within two to four seconds upon contact with the object. It is desirable to maintain this temperature throughout the spraying operation. The object 2 is then placed within a spraying booth 20, shown is FIG. 3, which includes a housing 22 having a clear plastic cover 24. The floor 26 of the spraying booth 20 includes of multiple layers of filtering material 28. A fan 30 located beneath the floor of the spraying booth 20 will draw the excess composition through the filtering media 28 and exhaust it through an appropriate length of conduit to a location that will not contaminate the object or surrounding environment. The composition coating is then applied by the airbrush 12 using several uniform passes maintaining a distance of between six and eight inches between the spray nozzle and the object.

After the object 2 is completely coated it is allowed to cool to room temperature (approximately 65-75°) which may take up to ten hours. Once the spray application is completed all coated surfaces will exhibit a uniform opaqueness when viewed at a 34 to 45 degree viewing angle in normal room lighting. Upon completion the surface of the object 2 will include an even coating that is no thicker than 0.00025 inches in any location.

The object is then white light scanned and the data points are collected to create a "point cloud" three dimensional image of the object's entire surface. Once the scanning process is concluded the coating on the object 2 can be easily removed with water. The use of a water based composition allows the object to be restored to its original condition without the use of cleaning solvents or mechanical cleaning devices which might result in the destruction of the original surface contour of the object 2.

FIG. 4 is a diagrammatic representation of the data collected when comparing the physical characteristics of the conventional coating process to the coating of the present invention. The white light three dimensional scanning process encounters problems where the surfaces to be scanned are reflective, refractive or the object is translucent or transparent. Conventionally, an object is coated with a powder like material or with a paint applied from a conventional aerosol paint can. While these techniques are effective in eliminating surface reflection or refraction they fail to create a uniform surface finish sufficient to facilitate accurate and consistent measurements of the objects under going white light scanning. A test was conducted to determine the thickness and uniformity of the coating applied using the conventional material and process and the results of this test are depicted in FIG. 4. An object 30 having a conventionally applied coating 32 is shown in FIG. 4. As is clearly shown the coating 32 is not uniform in thickness. As measured and illustrated, the thickness at the point labeled D1 is 0.02092 inches, at point D2 the thickness is 0.01068 inches and at point D3 the thickness is 0.01183 inches. The thickness of composition coating of the present invention (no greater than 0.00025 inches) is at least two orders of magnitude smaller than the conventionally applied coating and is therefore imperceptible on this diagrammatic representation. The thickness and uniformity of the composition coating of the invention are of critical importance in achieving extremely accurate scanning of objects during the three dimensional white light scanning process. Precision scanning is of utmost and critical importance in many areas of manufacture requiring extreme tolerances such as those found in the aerospace, surgical and automotive industries.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for white light scanning of an object comprising the steps of;
   cleaning the object to be scanned;
   preparing a composition consisting of corn starch, water, titanium dioxide, talc, calcium carbonate, a wetting agent and a gel thickener;
   placing said composition into an air powered spray brush;
   placing said object into a spraying booth;
   heating said object to a temperature that will facilitate evaporation of said water from said composition within two to four seconds upon contact with the object;
   coating said object with said composition applied through said air powered spray brush, whereby said coating is no thicker than 0.00025 inches and will exhibit a uniform opaqueness when viewed at a viewing angle of between 34 degrees to 45 degrees;
   allowing said object to cool to room temperature;
   scanning the composition coated object using a white light source to project controlled fringe patterns on said composition coated object;
   collecting data points using one or more cameras;
   processing data points to complete a three dimensional image of the object's surface.

2. The method for white light scanning of an object of claim 1 wherein said step of heating said object is further defined as heating said object to a temperature within the range of approximately 90 to 100° F.

3. The method for white light scanning of an object of claim 2, further including the step of maintaining the temperature of said object at approximately 90-100° F. from prior to the spraying step through completion of the spraying step.

4. The method for white light scanning of an object of claim 1 wherein the step of preparing the water based composition further includes the step of thoroughly mixing of the water based composition with deionized water in a ratio of up to 2 parts water to 1 part paint.

5. The method for white light scanning of an object of claim 1 wherein the water based composition is air brushed upon the object with an air pressure of about 5 psi to about 40 psi.

6. The method for white light scanning of an object of claim 1 wherein the object is allowed to cool to room temperature of approximately 65-75° F. prior to commencing the scanning process.

7. The method for white light scanning of an object of claim 1 further including the step of removing the water based composition coating after scanning by washing the object with water without the use of chemicals or mechanical devices that can damage the original surface of the object.

8. The method for white light scanning of an object of claim 1 further including the step of exhausting the composition that is not coated upon the object within the spray booth through the floor of the spray booth to prevent overspray from settling on the object and changing the thickness of thickness of the coating.

9. The method for white light scanning of an object of claim 8, wherein the water based composition passed through the floor of said spray booth is conveyed through a plurality of filtering media layers to a remote location under the influence of an exhaust fan.

10. The method for white light scanning of an object of claim 1 wherein the composition further consisting of a biocide, a fungicide and a defoamer.

* * * * *